United States Patent [19]
Haley et al.

[11] Patent Number: 5,419,839
[45] Date of Patent: May 30, 1995

[54] APPARATUS AND METHOD FOR TREATING WASTE SLUDGE

[75] Inventors: Earle Haley, Ft. Worth; Fred R. Huege, Calleyville; Vernon L. Moore, Dallas; Tom Elliston, Ft. Worth, all of Tex.

[73] Assignee: Chemical Lime Company, Fort Worth, Tex.

[21] Appl. No.: 281,769

[22] Filed: Jul. 28, 1994

Related U.S. Application Data

[62] Division of Ser. No. 102,429, Aug. 5, 1993.

[51] Int. Cl.$^6$ ............................................. C02F 11/14
[52] U.S. Cl. ...................... 210/751; 210/752
[58] Field of Search ............... 210/751, 752, 199, 205, 210/206; 366/151–153, 177, 182, 297, 320, 324

[56] References Cited

U.S. PATENT DOCUMENTS

| | | | |
|---|---|---|---|
| 4,079,003 | 3/1978 | Manchak | 210/747 |
| 4,306,978 | 12/1981 | Wurtz. | |
| 4,710,290 | 12/1987 | Briltz. | |
| 4,902,431 | 2/1990 | Nicholson et al.. | |
| 4,981,600 | 1/1991 | Tobler et al.. | |
| 5,013,458 | 5/1991 | Christy, Sr. et al. | 210/751 |
| 5,186,840 | 2/1993 | Christy et al. | 210/751 |
| 5,229,011 | 7/1993 | Christy, Sr. et al. | 210/751 |
| 5,277,825 | 1/1994 | Tobler et al. | 210/751 |
| 5,277,826 | 1/1994 | Burns et al. | 210/751 |

*Primary Examiner*—Neil McCarthy
*Attorney, Agent, or Firm*—Charles D. Gunter, Jr.

[57] ABSTRACT

An apparatus and method are shown for treating waste sludge. The apparatus includes a mixer housing having an elongated mixing auger therein. The housing has an inlet opening and an outlet opening with the elongated mixing auger being rotatably mounted within the housing between the inlet and outlet openings. A sludge conveyor supplies waste sludge to the inlet opening of the elongated mixer housing. An additive hopper contains an additive material to be combined with the sludge introduced within the mixer housing. A metering auger and series of spaced delivery conduits gradually introduce the additive material over a substantial interval of the mixing chamber beginning at a point downstream of the inlet opening to the mixer housing.

8 Claims, 3 Drawing Sheets

APPARATUS AND METHOD FOR TREATING WASTE SLUDGE

This application is a division, of application Ser. No. 08/102,429, filed Aug. 5, 1993.

BACKGROUND OF THE INVENTION

1. Field of the Invention

The present invention relates generally to an apparatus and method for stabilizing and pasteurizing waste water sludge by the addition of an alkaline material thereto and, specifically, to such a method and apparatus for reacting lime with dewatered waste water sludge for pasteurization, stabilization and disposal thereof.

2. Description of the Prior Art

Raw sludge, such as that obtained from municipal sewage treatment plants, contains large quantities of microorganisms, many of which are fecal in origin. Many of these microorganisms present a potential hazard to humans. As a result, sludge handling makes up a large portion of the capital cost and operating cost of the sewage treatment plant. The increasing scrutiny placed upon municipalities and other waste disposal agencies has increased the need for better stabilization, pasteurization and disposal techniques for waste sludge in order to render such materials either inert, stable, or non-hazardous.

Lime has been used for many years to treat waste materials. For example, lime has been historically used to treat open privies, and the like. In more recent times, studies conducted at municipal waste water treatment plants have shown that lime stabilization can be used to effectively eliminate odors, improve bacterial and pathogenic organism control and to provide a stable byproduct which can be, for example, applied to agricultural land. A number of recent patents discuss the treatment of waste sludge by mixing cement kiln dust, lime or other alkaline materials with the sludge so as to produce a disintegratable product which can be applied to land as a soil conditioner. See, for example, U.S. Pat. Nos. 4,781,842 and 4,554,002 issued to N-Viro Energy Systems, Ltd.

While the above patents show the desirability of mixing cement kiln dust with sludge, they do not specifically disclose the details of an apparatus or method for accomplishing the mixing.

U.S. Pat. No. 4,981,600 to Tobler et al., issued Jan. 1, 1991, shows an apparatus and method for treating waste sludge which comprises mixing cement kiln dust or other alkaline materials with sludge in an elongated auger mixer. An alkaline, additive material is conveyed from an additive hopper to the inlet end of the auger mixer. Sludge is simultaneously introduced to the inlet end of the mixer housing and the auger is rotated and sometimes elevated to mix the additive material and sludge and move the mixed material toward a discharge end of the auger housing.

Although the above apparatus represented an improvement in commercially available sludge mixing technology, the simultaneous introduction of sludge and additive material were found to result in less than even mixing between the alkaline, additive material and the sludge to be treated. The apparatus also required the use of a separate silo for supplying the additive material, as well as additional emissions control equipment. The apparatus was not able to simultaneously mix dirt, sludge and an alkaline additive when required and utilized a short mixer which elevated a single auger.

The present invention has as an object to provide an improved apparatus and method for treating waste sludge by contacting such sludge with an alkaline additive material and ensuring even mixing of the additive material with the sludge.

Another object of the invention is to preserve sanitary landfill capacity by mixing lime along with dirt and waste sludge, the addition of lime serving to lower the volume of dirt required to stabilize the sludge.

Another object of the invention is to provide such an apparatus having a dual compartment supply tank for supplying waste sludge and a stabilizing material such as dirt along with limestone and for varying the relative volumes of stabilizing material and waste sludge entering the apparatus.

Another object of the invention is to provide a mixing apparatus which allows the additive alkaline material to be directly unloaded into an additive hopper without requiring a silo, cyclone separator or other dust control mechanism separate from the mixing apparatus.

Another object of the invention is to provide a mixing apparatus which provides the metered introduction of the additive alkaline material to a mixer housing of the apparatus along a substantial portion of the length thereof in order to ensure more even mixing of the additive material and waste sludge being treated.

Another object of the invention is to provide an apparatus and method for treating waste sludge which is both economical in construction and reliable and efficient in use.

Another object of the invention is to provide an apparatus for treating waste sludge which has a low profile with respect to the ground, whereby sludge can be dumped directly into the apparatus without requiring double handling with a loader.

SUMMARY OF THE INVENTION

The apparatus of the invention is used to treat waste sludge supplied from a waste sludge source. The apparatus includes an elongated mixer housing having at least one elongated mixing auger contained therein. The elongated mixer housing has an inlet opening and an outlet opening which together define an elongated mixing chamber of a given length therebetween. The elongated mixing auger is rotatably mounted within the elongated mixer housing and extends between the inlet and outlet openings thereof. A sludge conveyor means is connected to the supply of waste sludge for introducing waste sludge to the inlet opening of the elongated mixer housing. An additive hopper receives an additive, alkaline material which is to be combined with the sludge introduced within the elongated mixer housing. Metering means are provided for receiving the additive material from the additive hopper and for gradually introducing the additive material over a substantial interval of the length of the elongated mixing chamber beginning at a point downstream of the inlet opening to the elongated mixer housing.

Preferably, the metering means comprises a metering auger housing located below the additive hopper and in communication therewith. The metering auger housing is preferably provided with a metering auger rotatably mounted therein. The metering means can further comprise delivery means connected to the metering auger housing for delivering additive material from the metering auger housing to the elongated mixing chamber and for introducing the additive material so delivered over a substantial interval of the length of the elongated mixing chamber. The delivery means can comprise a plurality of conduits which are connected between the metering auger housing and the main mixer housing, at spaced intervals.

A particle separator is preferably arranged in communication with the additive hopper for receiving particle laden dust therefrom and for separating out additive particles. Discharge means connect the particle separator to the main mixer housing at a point adjacent the outlet opening thereof for combining separated additive particles with the material contained within the main mixer housing prior to the material exiting the outlet opening thereof. The particle separator can preferably comprise a bag house having an inlet opening and a discharge chute. The inlet opening is connected to the top of the additive hopper and the discharge chute is connected to the main mixer housing. The particle separator also has an exhaust opening leading to an exhaust fan to vent clean air to the atmosphere.

The waste sludge is preferably provided from a dual compartment supply tank which includes a sludge compartment for receiving waste sludge and a stabilizing compartment for receiving a stabilizing or filler material, such as dirt. The sludge compartment is connected to the inlet opening of the main mixer housing by the sludge conveyor means and includes an auger rotatably mounted within a conduit. The stabilizing compartment is similarly connected to the inlet opening of the main mixer housing by a conveyor means including an auger rotatably mounted within a conduit. By adjusting the amount of alkaline material supplied to the inlet of the main mixer housing, the volume of dirt required for stabilizing the sludge can be reduced.

In the method of the invention, an additive material to be added to the waste sludge is placed within an additive hopper. Waste sludge is introduced to the inlet opening of a main mixer housing having an elongated mixing chamber formed between the inlet opening and an outlet opening thereof. The main mixer housing has a mixing auger rotatably mounted therein for moving waste sludge between the inlet and outlet openings. A metering means is connected between the additive hopper and the main mixer housing for receiving additive material from the additive hopper and for gradually introducing the additive material to the elongated mixing chamber of the main mixer housing beginning at a point downstream of the inlet opening to the elongated mixer housing. The mixing auger is rotated within the main mixer housing to cause the waste sludge and additive material to be mixed together within the elongated mixing chamber and to be conveyed toward and discharged from the outlet opening of the main mixer housing. By connecting a bag house to the additive hopper and main mixer housing additive material can be blown directly into the additive hopper under a positive air pressure. The positive air pressure conveys particle laden dust from the additive hopper to the bag house for separation into clean air and dust particles, the separated dust particles being supplied to the main mixer housing and the clean air being exhausted from the bag house.

Additional objects, features and advantages will be apparent in the written description which follows.

BRIEF DESCRIPTION OF THE DRAWINGS

in FIG. 1;

in FIG. 1;

FIG. 5 is a partial, isolated view of another embodiment of the mixing auger used in the apparatus of the invention, the auger being equipped with removable mixing spikes; and FIG. 6 is a close-up view of a section of the mixing auger of FIG. 5, showing one of the removable mixing spikes in exploded fashion.

DETAILED DESCRIPTION OF THE INVENTION

Figure 1:
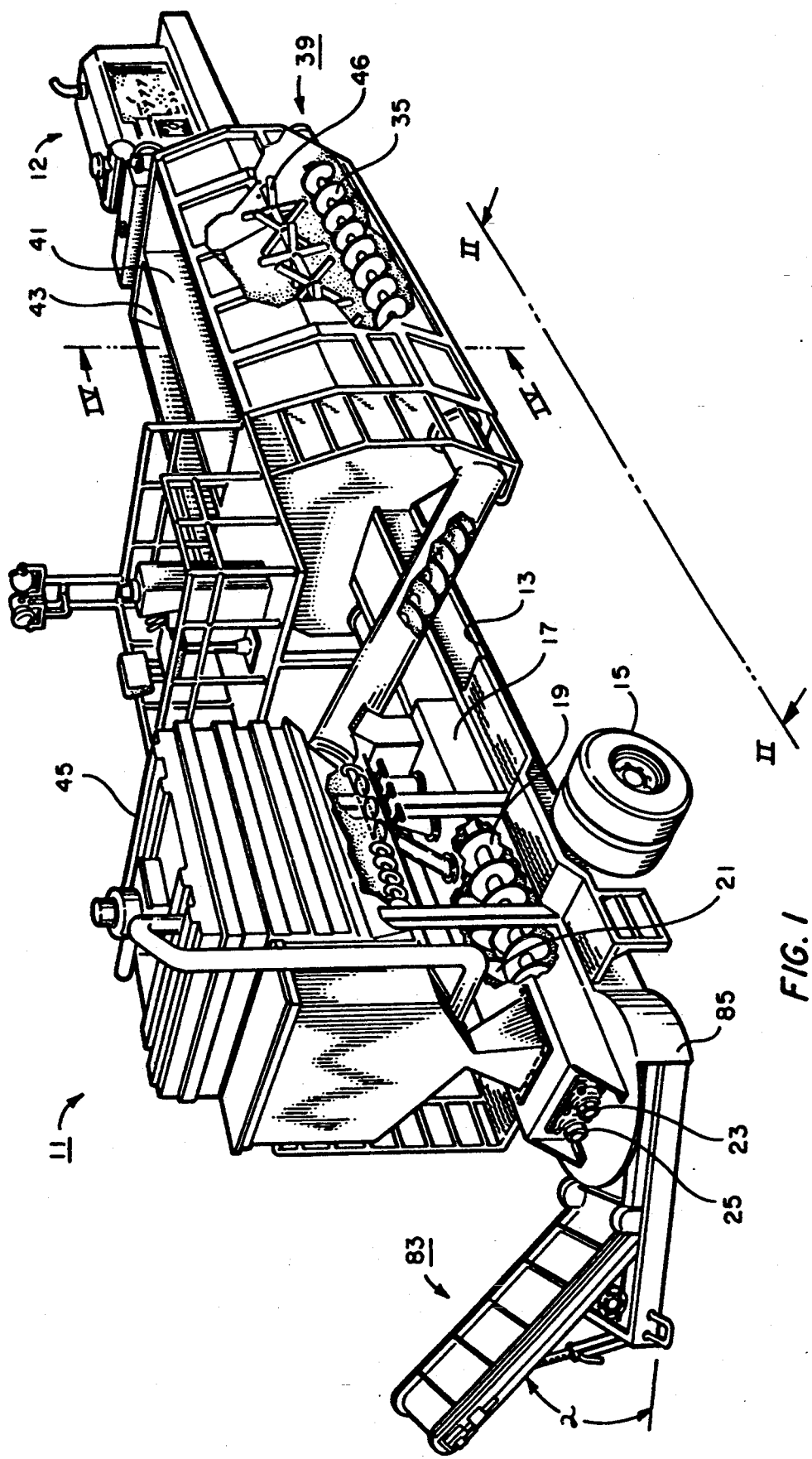
FIG. 1 is a perspective view, partly broken away of the apparatus for treating waste sludge of the invention.
Figure 3:
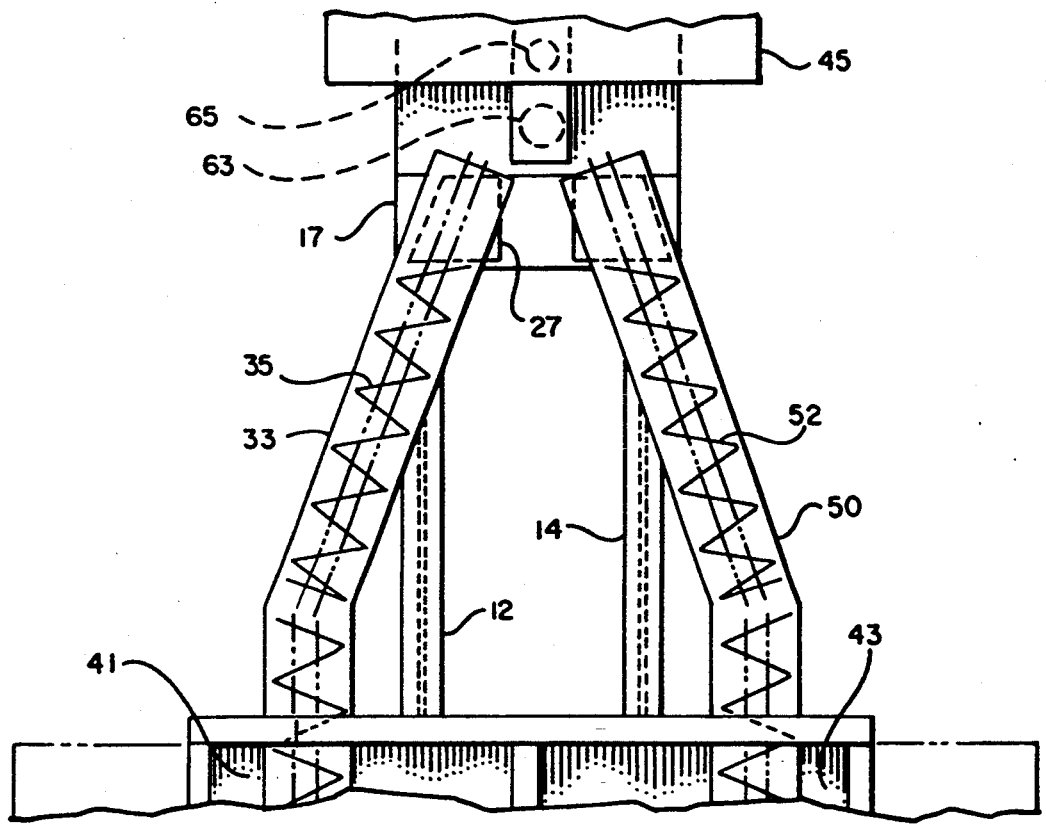
FIG. 3 is a partial view, looking down, upon portions of the additive hopper, sludge and filler conveyor mechanisms of the apparatus of FIG. 1.

The apparatus for treating waste sludge of the invention is shown in FIG. 1, designated generally as 11. The apparatus 11 is shown in the preferred embodiment of FIG. 1 as being mounted upon a trailer chassis 13 including I-beams (12, 14 in FIGS. 3 and 4) and having wheels 15 which allow the apparatus 11 to be transported from one location to another. It will be understood, however, that the apparatus 11 could be mounted upon a skid or other appropriate base, as well. As will be explained in greater detail, the apparatus is self-contained and easily transportable to a required job site.

Figure 2:
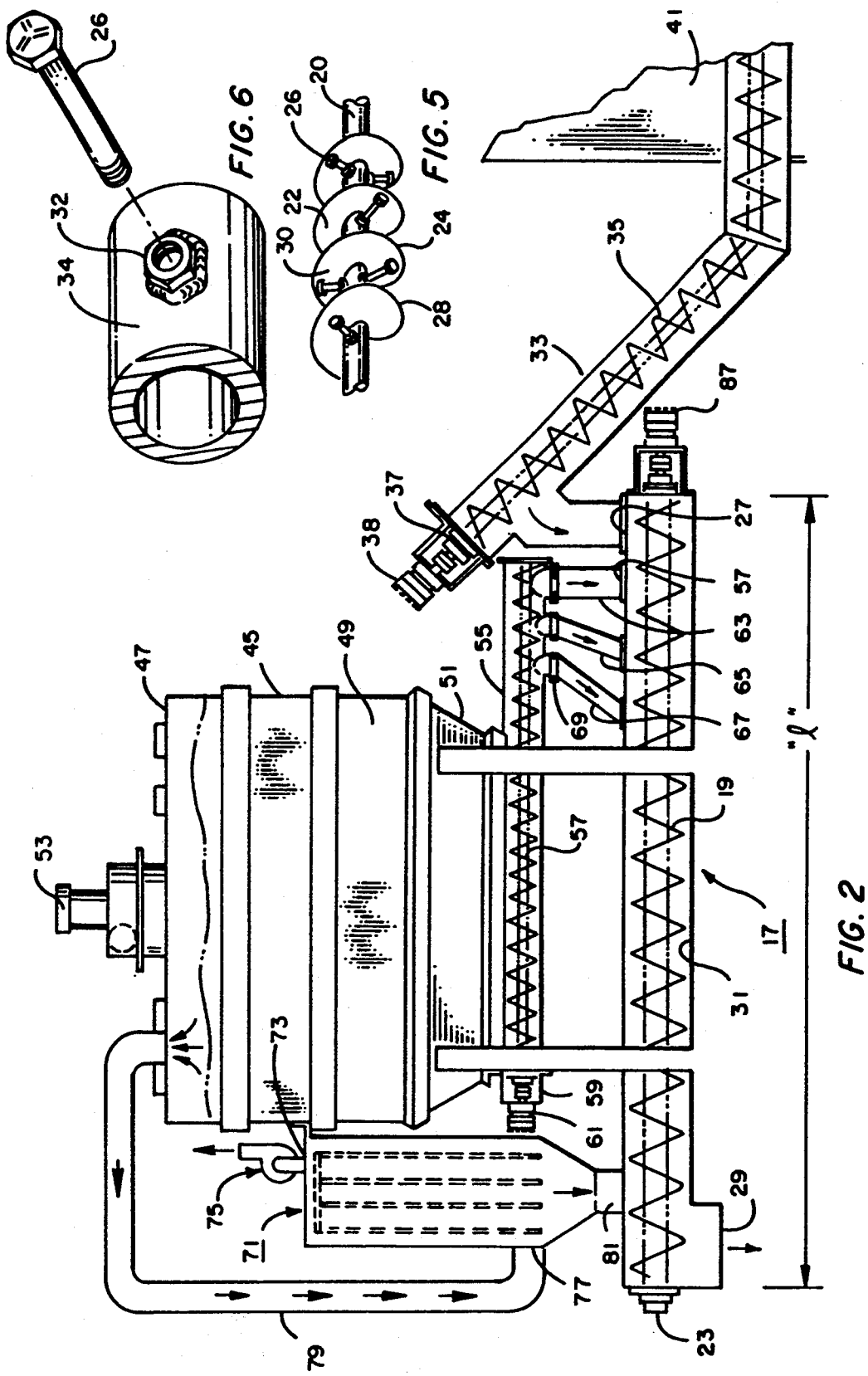
FIG. 2 is a side, partial cross-sectional view taken along lines II.—II.

The apparatus 11, as best seen in FIG. 2, includes an elongated mixer housing 17 having at least one elongated mixing auger 19 contained therein. As shown in FIG. 1, the mixer housing 17 is preferably provided with a second mixing auger 21 arranged in a parallel plane with the first auger 19, the augers being rotatably mounted, as by bearings 23, 25 within the mixer housing 17. A convenient drive means, such as a conventional hydraulic motor 12 (FIG. 1) and conventional hydraulic couplings (87 in FIG. 2) are provided for rotating the augers 19, 21 within the housing 17.

As shown in FIG. 5, the mixing augers 19, 21 each have a shaft 20 having a plurality of flutes 22 mounted thereon and spaced about the shaft 20 so that the outer edges 24 thereof form a helical path about the shaft. In one embodiment of the invention, a plurality of removable mixing spikes 26 are mounted on the shaft 20 between the opposing faces 28, 30 of adjacent flutes. As shown in FIG. 6, each mixing spike 26 can be a threaded bolt which is matingly received with a companion nut 32 which is rigidly affixed, as by welding, to the shaft exterior surface 34. Depending upon the sludge density, the number and arrangement of the mixing spikes 26 can be varied in any desired fashion.

As shown in FIG. 2, the mixer housing 17 has an inlet opening 27 and an outlet opening 29 which define an elongated mixing chamber 31 of a given length "l" therebetween. Movement of the augers 19, 21 within the housing 17 cause materials contained therein to be moved from the inlet opening 27 toward the outlet opening 29. The mixing chamber 31 is not inclined and augers 19, 21 lie in a plane generally parallel to the ground in the preferred embodiment of FIG. 2.

A sludge conveyor means, such as conduit 33 is connected to the supply of waste sludge for introducing waste sludge to the inlet opening 27 of the elongated mixer housing 17. The conveyor means preferably comprises a sludge auger 35 mounted on a bearing 37 and driven by a suitable drive means (38 in FIG. 2) for moving waste sludge in the direction of the inlet opening 27.

Figure 4:
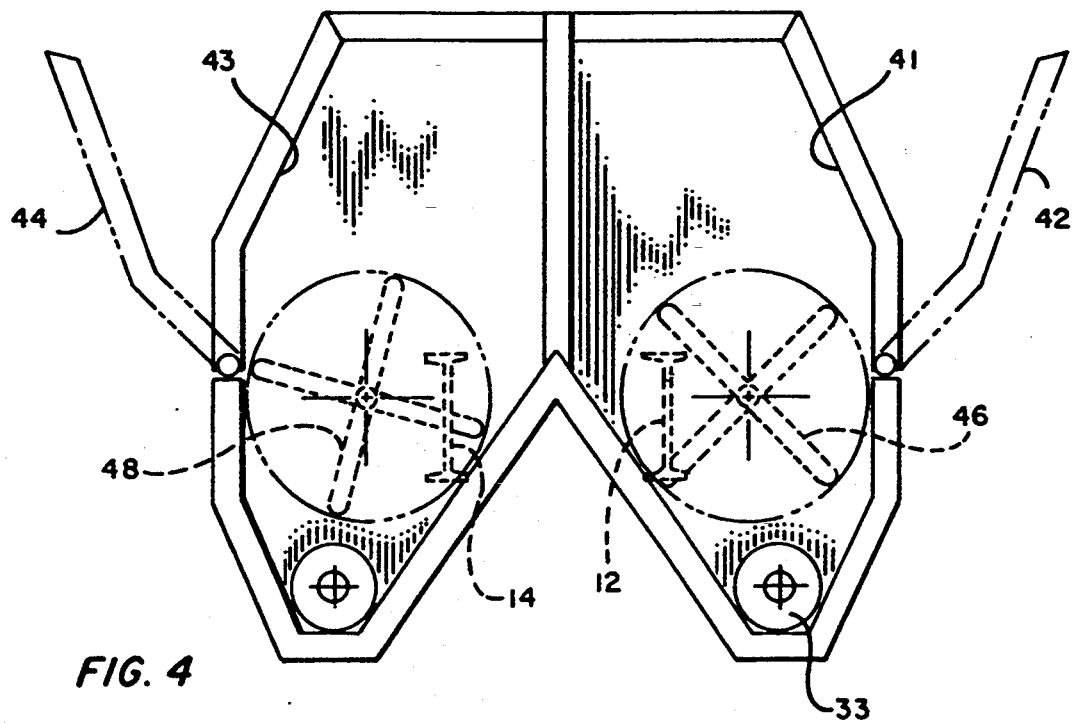
FIG. 4 is a cross-sectional view taken along lines IV.—IV.

As shown in FIGS. 1 and 4, the source of sludge preferably includes a dual compartment supply tank 39 having a sludge compartment 41 and having a stabilizing compartment 43 for receiving a stabilizing or filler material such as dirt. The sludge is typically not raw sewage but is "dewatered sludge." Dewatered sludge is a more concentrated mixture than liquid sludge, typically produced by mechanically removing some of the liquid, as by belt filtration. Many dewatering processes produce a sludge that contains between about 16 to as much as 40% solids. The typical dewatered sludges treated with the processes of the invention will have a solids content between about 20 to 35% solids.

The height of the openings to the compartments 41, 43 is selected to allow a dump truck or loader belts to easily discharge material into the compartments. As shown in FIG. 4, each compartment 41, 43 is provided with a pivoting door 42, 44 to provide convenient access to the interior thereof. Paddle wheels 46, 48 are also rotatably mounted within the compartments 41, 43 for agitating the materials contained therein.

The stabilizing compartment 43 is connected to the inlet opening 27 of the mixer housing 17 by a conduit 50 and auger 52 (FIG. 3) identical to that of the sludge conduit 33 and auger 35 previously described. By adjusting the speed of the sludge or stabilizing material augers, the relative volumes of the sludge and dirt entering the mixer housing 17 can be controlled within desired limits. By properly controlling the addition of lime to the waste sludge, the volume of dirt required to stabilize the sludge can be reduced. For example, where one part dirt was required to be mixed with one part sludge in the past, the addition of lime allows the use of about one half part dirt per part of sludge, thereby conserving landfill space.

Returning to FIG. 2, there is shown an additive hopper 45 for receiving an additive material to be combined with the sludge introduced within the elongated mixer housing 17. The additive material received within the hopper 45 is preferably an alkaline material such as lime, cement kiln dust, or other alkaline material. The most preferred material is quicklime, CaO. The additive hopper includes a top 47 and sidewalls 49 which together with a discharge chute 51 define an enclosed compartment. A fill port 53 is provided in the top 47 of the hopper and can be connected to a source of lime. Preferably, the lime is blown into the additive hopper 45 from a supply truck under a positive air pressure using an appropriate blower. By optionally locating the blower on the trailer chassis 13, the unit can be provided as a completely self-contained system. The hopper 45 is constructed to accept at least about 10 psi air supply for supplying lime from a trailer or other supply source.

Lime is discharged through the chute 51 of the additive hopper 45 into a metering means including a metering auger housing 55 which receives additive material from the additive hopper for gradually introducing the additive material over a substantial interval of the length "l" (FIG. 2) of the elongated mixing chamber 17 beginning at a point 57 downstream of the inlet opening 27 to the mixer housing 17.

As shown in FIG. 2, the metering auger housing is located directly below the discharge chute 51 of the additive hopper 45 and communicates therewith. The metering auger housing includes a metering auger 57 rotatably mounted within the housing by means of a suitable bearing structure 59 connected to a suitable drive means 61 such as the hydraulic drive previously described. The metering means also includes delivery means for delivering the additive material from the metering auger housing 55 to the elongated mixing chamber 17 and for introducing the additive material so delivered over a substantial interval of the length of the elongated mixing chamber 31. Preferably, the delivery means comprises a plurality of conduits 63, 65, 67 which are connected between the metering auger housing 55 and the main mixer housing at spaced intervals. Although three conduits are shown in the embodiment of FIG. 2, it will be understood that two conduits could be used in some cases, as well. Other delivery means, such as a slot provided in the top of the housing 17 could be utilized, as well.

It has been found that by gradually introducing the lime or other alkaline additive material over a substantial interval, rather than simultaneously with the waste sludge at the inlet opening 27, that improved mixing and interaction of the reactive components is achieved. In the case of, for example, a 20 foot long mixing auger, the delivery means is preferably spaced over at least about a 4 foot and preferably about a 6 to 8 foot interval along the length "l" of the mixing chamber 31. These dimensions can be varied, depending upon the expected sludge density. By running the mixing auger 19 at a constant speed and by adjusting the rate of the metering auger 57, the lime content of the sludge-lime mixture can be controlled within desired limits. Preferably, the lime is added to achieve a 5 to 30% lime by weight mixture, most preferably about 20% by weight lime. The conduits 63, 65, 67 can each be provided with a valve means, such as a gate valve 69 which can be adjusted to additionally control the rate of addition and relative spacing the addition of the additive material to the mixing chamber 31.

As shown in FIG. 2, a particle separator 71 is provided as an integral part of the apparatus and is connected to the top 47 of additive hopper 45 for receiving particle laden dust therefrom and for separating out additive particles. The particle separator preferably comprises a bag house 71 having an inlet opening 77 connected by means of a conduit 79 with the top 47 of the additive hopper 45. The bag house 71 also has a discharge chute 81 which is connected to the main mixer housing 17. The bag house 71 also has an exhaust opening 73 leading to an exhaust fan 75 to vent cleaned air.

By blowing additive material into the additive hopper 45 under positive air pressure through the fill port 53, particle laden dust is conveyed through the conduit 79 and into the interior of the bag house 71 for particle separation with the solid particles being discharged through the chute 81 to the main mixer housing 17 at a point adjacent the outlet opening 29 thereof. It is not necessary to have a separate silo, bag house or cyclone separator at the job site.

As shown in FIG. 1, a discharge conveyor 83 is preferably rotatably mounted to the front end of the chassis 13 by means of turret 85 adjacent the outlet opening 29 of the main mixer housing for receiving treated sludge which is discharged from the main mixer housing 17.

The discharge conveyor 83 is preferably inclined at an angle "α" with respect to a surrounding ground or support surface for discharging treated sludge into a mound on such surface. In the embodiment of FIG. 1, the turret 85 allows the discharge conveyor 83 to be moved through an approximate 180° arc.

In the method of the invention, an analysis of the sludge would usually be performed beforehand to determine the lime requirements to, for example, kill all the pathogens present in a 30 minute time period. The weight of the sludge per cubic foot would also be determined. This laboratory data allows the speed of the sludge and metering augers to be set to obtain the desired percentage of lime added per cubic foot of sludge. In operation, the additive material, such as lime, is blown into the additive hopper under positive air pressure. Waste sludge is introduced to the inlet opening 27 of the main mixer housing 17 by means of the conduit 33 and auger 35 which are connected to the sludge compartment 41. If desired, a stabilizing or filler material such as dirt is simultaneously delivered to the inlet opening 27 by means of a similar supply conduit 50 and auger 52 communicating between the inlet opening 27 and the stabilizing material compartment 43.

The metering auger housing 55 located below the additive hopper 45 receives additive material from the hopper. The metering auger gradually introduces the additive material to the elongated mixing chamber 31 of the main mixer housing 17 beginning at a point down stream of the inlet opening 27 to the elongated mixer housing 17. This can be conveniently accomplished through delivery conduit 63, 65, 67. The mixing auger 19 within the main mixer housing 17 is rotated by means of the hydraulic motor 12 to cause the waste sludge and additive material to be mixed together within the elongated mixing chamber and to be conveyed toward and discharged from the outlet opening 29.

An invention has been provided with several advantages. The apparatus of the invention provides a reliable and economical means for treating waste sludge in order to disinfect, stabilize and render such material inert. The dual compartment sludge and stabilizing material tank provides a convenient means for adjusting the relative volumes of the sludge and dirt entering the mixing chamber of the apparatus. The metering means and delivery conduit arrangement of the apparatus provide a gradual introduction of the additive material over a substantial length of the mixing chamber in order to ensure more uniform mixing and intimate reaction of the sludge and additive material. The particle separator arrangement allows a particulate material such as lime to be blown directly into the additive hopper without requiring a separate particle separating cyclone or bag house and effectively filters out particulate material for reintroduction to the mixer housing at a point adjacent the discharge opening thereof. The apparatus is completely self-contained and can be easily transported to and relocated at the job site.

While the invention has been shown in only one of its forms, it is not thus limited but is susceptible to various changes and modifications without departing from the spirit thereof.

What is claimed is:

1. A method for treating waste sludge comprising the steps of:
   placing an additive material to be added to the waste sludge in an additive hopper;
   introducing the waste sludge to an inlet opening of an elongated mixer housing having an elongated mixing chamber formed between the inlet opening and an outlet opening thereof, the elongated mixer housing having a mixing auger rotatably mounted therein for moving waste sludge between the inlet and outlet openings;
   connecting a metering means between the additive hopper and the elongated mixer housing for receiving additive material from the additive hopper and for introducing the additive material to the elongated mixing chamber of the elongated mixer housing through at least two discrete and spaced apart openings provided in the elongated mixer housing beginning at a point downstream of the inlet opening to the elongated mixer housing; and
   rotating the mixing auger within the elongated mixer housing to cause the waste sludge and additive material to be mixed together within the elongated mixing chamber and to be conveyed toward and discharged from the outlet opening of the elongated mixer housing.

2. The method of claim 1, wherein the metering means is a metering auger housing located below the additive hopper and in communication therewith, the metering auger housing having a metering auger rotatably mounted therein, and wherein the metering auger housing communicates with the elongated mixer housing by means of a plurality of conduits which are connected between the metering auger housing and the elongated mixer housing at spaced intervals.

3. The method of claim 2, further comprising the steps of:
   connecting a particle separator to the additive hopper for receiving particle laden dust therefrom and for separating out additive particles; and
   connecting the particle separator to the elongated mixer housing at a point adjacent the outlet opening thereof and operating the particle separator to thereby combine separated additive particles with the material contained within the elongated mixer housing prior to the material exiting the outlet opening thereof.

4. The method of claim 3, wherein the particle separator is a bag house having an inlet opening, connected to the additive hopper, an exhaust opening connected to an exhaust fan and a discharge chute which is connected to the elongated mixer housing.

5. The method of claim 4, further comprising the steps of blowing additive material into the additive hopper under a positive air pressure, the positive air pressure being used to convey particle laden dust to the bag house for separation into clean air and dust particles, the clean air being exhausted through the exhaust fan and the dust particles discharged to the elongated mixer housing.

6. The method of claim 5, further comprising the steps of:
   supplying waste sludge to be treated to a dual compartment supply tank having a sludge compartment for receiving waste sludge and having a stabilizing material compartment for receiving a stabilizing material, the sludge compartment being connected to the inlet opening of the elongated mixer housing by a sludge conveyor means including an auger rotatably mounted within a conduit, the stabilizing material compartment also being connected to the inlet opening of the elongated mixer housing by a conveyor means including an auger rotatably mounted within a conduit.

7. The method of claim 6, wherein the stabilizing material which is added to the waste sludge is dirt.

8. The method of claim 7, wherein the additive material which is added to the waste sludge is quicklime.

* * * * *